US008349243B2

(12) United States Patent
Lee et al.

(10) Patent No.: US 8,349,243 B2
(45) Date of Patent: *Jan. 8, 2013

(54) INJECTION MOLDED PRODUCT

(75) Inventors: Moon-Hee Lee, Daegu (KR); Jong-Man Park, Goomi-si (KR)

(73) Assignee: LG Electronics Inc., Seoul (KR)

( * ) Notice: Subject to any disclaimer, the term of this patent is extended or adjusted under 35 U.S.C. 154(b) by 255 days.

This patent is subject to a terminal disclaimer.

(21) Appl. No.: 12/441,962

(22) PCT Filed: Sep. 5, 2007

(86) PCT No.: PCT/KR2007/004284
§ 371 (c)(1),
(2), (4) Date: Mar. 19, 2009

(87) PCT Pub. No.: WO2008/035871
PCT Pub. Date: Mar. 27, 2008

(65) Prior Publication Data
US 2010/0021724 A1 Jan. 28, 2010

(30) Foreign Application Priority Data
Sep. 20, 2006 (KR) .................. 10-2006-0091100

(51) Int. Cl.
B29C 45/00 (2006.01)
B28B 11/08 (2006.01)
(52) U.S. Cl. ....... 264/328.1; 264/81; 264/167; 264/226; 264/338
(58) Field of Classification Search .................. 428/156, 428/212, 409, 38, 141; 264/328.1, 81, 167, 264/226, 293, 338
See application file for complete search history.

(56) References Cited

U.S. PATENT DOCUMENTS

| 5,840,407 | A | 11/1998 | Futhey et al. ................. 428/167 |
| 6,077,472 | A | 6/2000 | Kataoka et al. |
| 6,432,332 | B1 | 8/2002 | Matsco et al. .................. 264/39 |
| 6,770,348 | B2 * | 8/2004 | Lee ............................. 428/66.5 |
| 2003/0183961 | A1 | 10/2003 | Masuda et al. ................. 264/2.5 |
| 2005/0260349 | A1 | 11/2005 | Pawlowski et al. ........... 427/282 |

FOREIGN PATENT DOCUMENTS

| DE | 44 29 625 A1 | 2/1996 |
| EP | 1 588 989 A2 | 10/2005 |
| EP | 1 669 191 A1 | 6/2006 |
| GB | 2 421 212 B | 1/2008 |
| JP | 11-179736 | 7/1999 |
| JP | 11-245233 | 9/1999 |

(Continued)

OTHER PUBLICATIONS

International Search Report dated Dec. 14, 2007.

(Continued)

Primary Examiner — Donald J Loney
(74) Attorney, Agent, or Firm — Ked & Associates LLP

(57) ABSTRACT

An injection molded product is provided that does not require any separate processes after the injection molding and on a surface of which a beautiful pattern is formed. The injection molded product includes a highly even surface and an irregular minute prominent surface having a profile having an arithmetic mean deviation higher than an arithmetic mean deviation of a profile of the highly even surface, and on which a pattern is formed by a difference in the arithmetic mean deviation of the profile of the highly even surface and of the irregular minute prominent surface.

4 Claims, 7 Drawing Sheets

FOREIGN PATENT DOCUMENTS

| | | |
|---|---|---|
| JP | 2004-054218 A | 2/2004 |
| JP | 2007-160637 A | 6/2007 |
| KR | 2003-0074969 | 9/2003 |
| WO | WO 95/13910 A1 | 5/1995 |

OTHER PUBLICATIONS

U.S. Office Action issued in U.S. Appl. No. 12/441,953 dated Dec. 2, 2011.

PCT International Search Report dated Dec. 14, 2007 issued in Application No. PCT/KR2007/004283.

U.S. Office Action dated May 11, 2011 issued in U.S. Appl. No. 12/441,953.

European Search Report dated Mar. 7, 2011 issued in Application No. 07 80 8077.

European Search Report dated Mar. 7, 2011 issued in Application No. 07 80 8078.

Chinese Office Action dated Mar. 21, 2011 issued in Application No. 200780035060.5 (with translation).

Chinese Office Action dated Mar. 21, 2011 issued in Application No. 200780035063.9 (with translation).

European Search Report dated Apr. 30, 2012 issued in Application No. 07 808 078.5.

* cited by examiner (a)

(b)

INJECTION MOLDED PRODUCT

BACKGROUND OF THE INVENTION

1. Field of the Invention

The present invention relates to an injection molded product and, more particularly, to an injection molded product manufactured by injection molding of synthetic resins such as a plastic.

2. Description of the Related Art

FIG. 1 illustrates a related injection molded product, and a predetermined pattern (letters are the examples of the pattern in the present invention) is formed on the injection molded product in FIG. 1a as printing ink on the injection molded product. However, in this case some disadvantage in that as lot of costs and time are required due to the addition of the process manufacturing cabinets used for various image display devices and etc, since a printing process has to be added after the injection molding.

Another injection molded product is illustrated in FIG. 1b, and an intaglio pattern "Canon" is formed as illustrated. The injection molded product on which an embossed pattern or an intaglio pattern are formed does not need a separate printing process as different from the injection molded product illustrated in FIG. 1a. However, the intaglio pattern or embossed pattern is not beautiful and is regarded as weary, since it has been used for a long time, and because of this, the demands for injection molded products on which new patterns are formed has been raised in the related industry.

Starting the above-mentioned demands, the subject about forming patterns with any other method on the same plane excepting printing was raised, and the method forming patterns as etched was examined. FIG. 2 illustrates an injection molded material which is injection molded by a mold that the surface is treated as etched.

FIG. 2a is a photograph taken as the real size, FIG. 2b is a photograph that a portion r1 of FIG. 2a is taken as magnified 600 times, and FIG. 2c is a result of measuring prominence as cutting off along the line c1 in FIG. 2a (progressing speed of a measuring instrument is 0.3 mm/s, and the measuring cut off is 0.8 mm). For further reference, the line marked a1 is the line corresponding to the average height of the prominence of represented part w1.

As a result of measuring the part w1 which is wide enough to secure the representing quality on the surface s1, the arithmetic average roughness of the prominence is about 9.154 μm, and the average thickness is about 200 μm.

However, the straight quality of the boundary is reduced due to the thickness of the prominence when the boundary of pattern is formed on the surface of the injection molded product due to the surface on which thick prominence as above is formed and the even surface (surface almost reflecting objects) that is in the limelight recently, therefore, the external appearance cannot be beautiful.

SUMMARY OF THE INVENTION

The present invention is contrived to overcome the above-mentioned disadvantage, and an object of the present invention is to provide an injection molded product that a beautiful pattern which is not required with any separate processes after the injection molding is formed on the surface.

In order to achieve the above-mentioned object, there is provided a pattern due to the boundary between the surfaces of different roughness as dividing the surfaces in accordance of the difference of the roughness.

According to the present invention, there is provided an injection molded product on which a beautiful pattern that the any separate process after the injection molding is not required is formed.

DETAILED DESCRIPTION OF THE PREFERRED EMBODIMENTS

In order to achieve the above-mentioned objects, the present invention provides an injection molded product comprising a highly even surface; and an irregular minute prominent surface of an arithmetic mean deviation of the profile higher than the arithmetic mean deviation of the profile of the highly even surface, and on which a pattern is formed due to the difference of the arithmetic mean deviation of the profile between the highly even surface and the irregular minute surface.

It is proper for the arithmetic mean deviation of the profile of the highly even surface to be 0.012 μm to 0.073 μm, and it is proper for the arithmetic mean deviation of the profile of the irregular minute prominent surface to be 0.158 μm to 1.374 μm.

It is proper for the height of the average line of the irregular minute prominent surface to be 1 μm to 100 μm with the average of the highly even surface as a standard at the boundary of the highly even surface and the irregular minute prominent surface.

Figure 1:
FIG. 1 is a photograph illustrating a related injection molded product on which a pattern is formed.
Figure 1:
Figure 2:
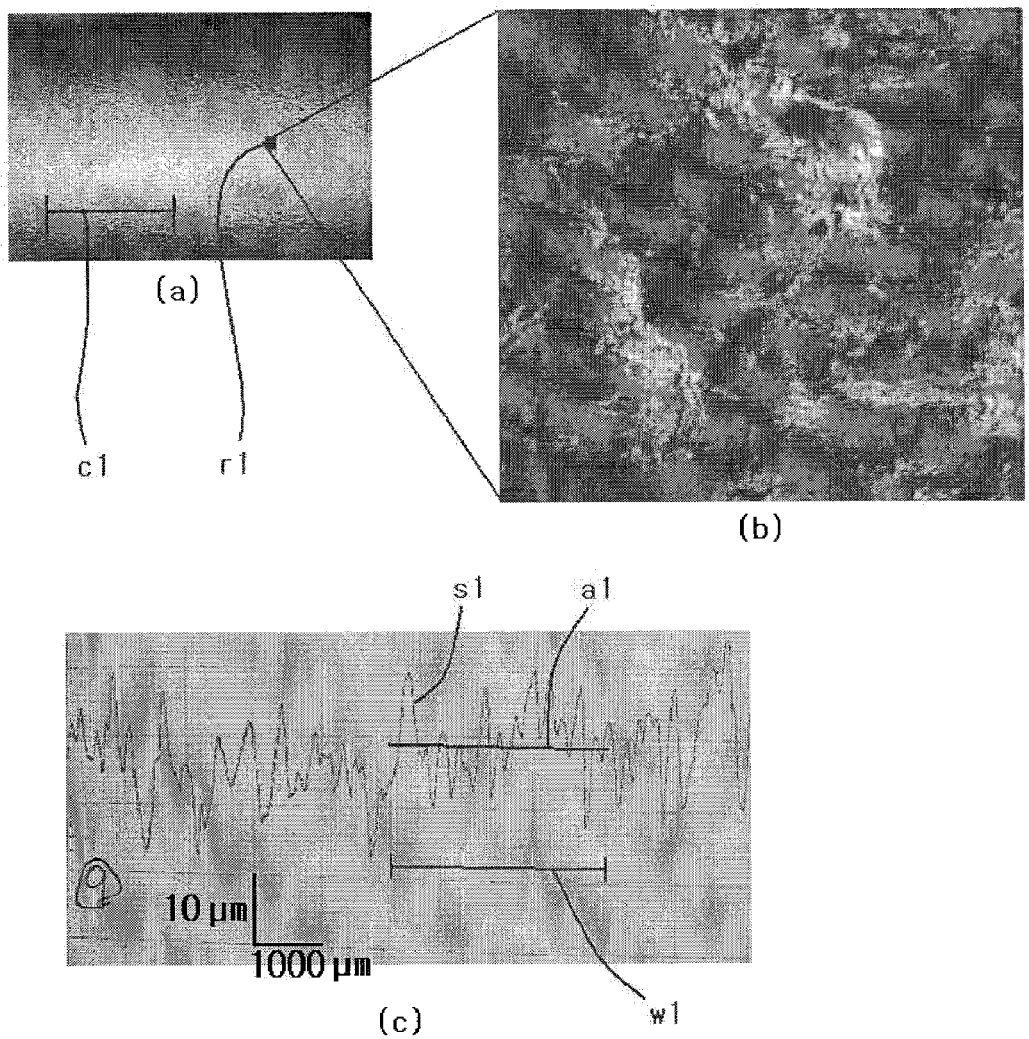
FIG. 2 is a photograph illustrating an injection molded product on which the related thick prominence is formed.
Figure 3:
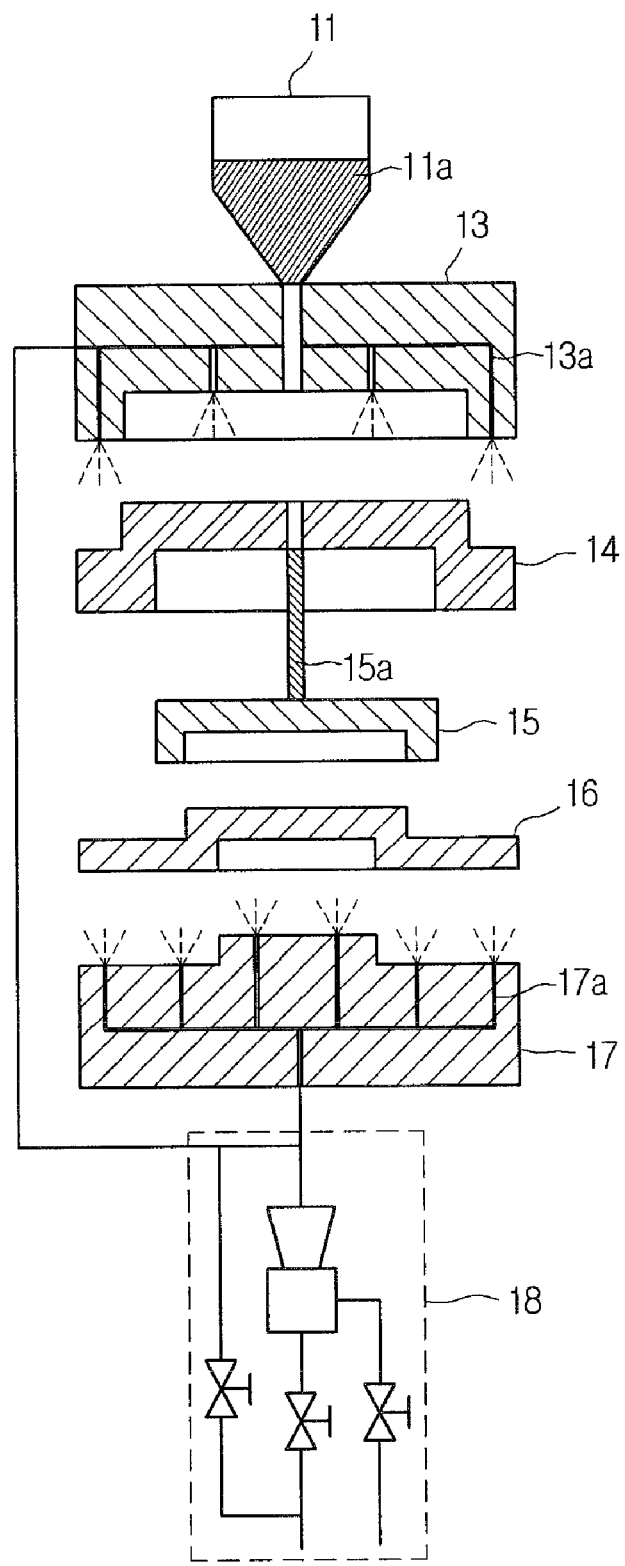
FIG. 3 is a schematic diagram illustrating a preferred embodiment of a system for injection molding.

As the injection molded product according to the present invention is manufactured by a mold for injection molding, reference will now be made in detail as for the mold for injection molding with reference to FIGS. 3 to 5. FIG. 3 illustrates the principle parts of the injection molding system using the injection molding mold according to the present invention. The melting liquid supply unit 11 is a means storing the melting fluid 11a and supplying it to the mold, and synthetic resins such as polycarbonate, High-Impact Polystyrene HIPS and ABS resin are applicable for the melting liquid 11a.

The upper mold core 14 and the lower mold core 16 are the elements deciding the external form of the injection molding products, and the melting liquid is supplied to the space between them. As the upper mold 13 and the lower mold 17 are what heats and refrigerates the upper mold core 14 and the lower mold core 16, each of supply pipes 13a and 17a are formed in the inside of them, and air and gaseous fuel are supplied through the pipes from the air and gaseous fuel supply device 18.

As illustrated, the upper mold core 14 and the lower mold core 16 may be heated as the injected air and gaseous fuel ignite, and the time taken for the injection molding process can be greatly reduced. Though it is not illustrated in FIG. 3, a refrigerating path may be formed in the upper mold core 14 and the lower mold core 16, and the refrigeration can be faster, the time taken for the injection molding process can be greatly reduced, and the surface of the injection molding product 15 can be highly even when a refrigerating liquid including air flows through the refrigerating path. As the un-described reference numerals 15a is a portion of the injection molding product hardened in the passage of the melting liquid, it is usual to remove the portion in the injection molding process.

Each of the reference numerals 13, 14, 16 and 17 is described as an upper mold, an upper mold core, a lower mold core and a lower mold, however, the element directly deciding the external form, especially the surface, of the injection molded product will be called as a "mold" on the following. Therefore, the upper mold core 14 and the lower mold core 16 in FIG. 3 are molds, and the lower mold core 16 in FIG. 3 will be provided as an example on the following.

On the other hand, the injection molded product according to the present invention is not only manufactured by the injection molding system configured as above but is also possible to be manufactured by other injection molding systems.

Figure 4:
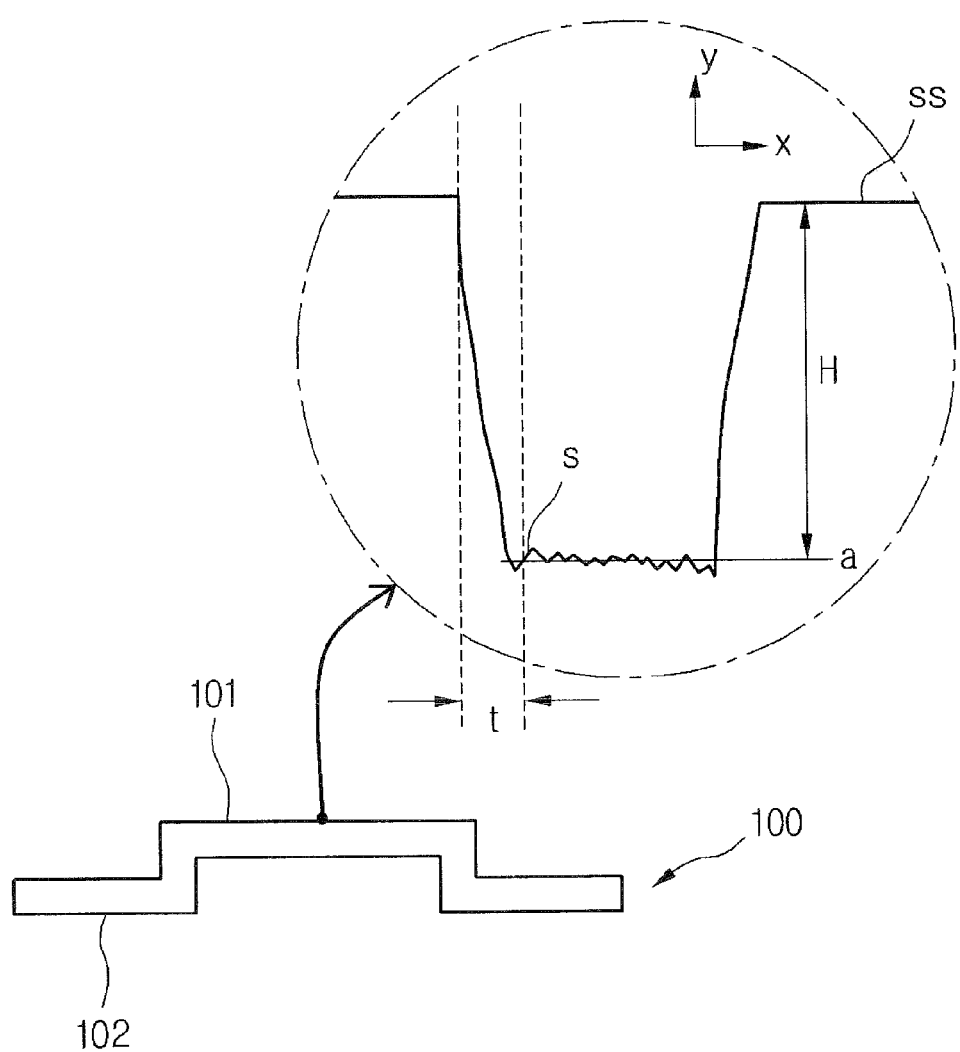
FIG. 4 is a cross-sectional view illustrating a mold used for manufacturing the injection molded products according to the present invention.

FIG. 4 illustrates a mold 100 used for manufacturing injection molded products according to the present invention, and it is corresponded to the lower mold core 16 in FIG. 3. As illustrated in FIG. 4, the mold 100 includes a contact surface 101 contacting the supplied melting liquid and a non-contact surface 102 that doesn't contact the melting liquid, and the contact surface 101 includes a highly even contact surface SS and the irregular prominent contact surface S. As giving a reference, the magnified view in FIG. 4 is that length of the party is extended 100 times compared to the part x, and the height H between the highly even contact surface ss and the irregular minute contact surface s is not seen by human eyes and not felt by human sense of touch in actuality.

The highly even contact surface ss is a part for the corresponded injection molded product to be formed as a highly even contact surface, and the arithmetic mean deviation of the profile is 0.012 μm to 0.073 μm. To form a highly even surface reflecting objects as a mirror on the injection molded product with the highly even contact surface ss, there has to be secured an arithmetic mean deviation of the profile less than 0.073 μm, and the value of the arithmetic mean deviation of the profile is the lower, the better, but the value of the arithmetic mean deviation of the profile lower than 0.012 μm is not required much, since it is technically hard and the difference is not discerned by human eyes.

Further, the irregular prominent contact surface s is a surface formed by sand blasted, and the arithmetic mean deviation of the profile is 0.158 μm to 1.374 μm. The arithmetic mean deviation of the profile of the irregular prominent surface is greatly affected by the sizes of the particles and etc used for the sand blasting method. The size of the particle used in the present preferred embodiment is 0.05 μm to 0.3 μm. It takes much time and costs in sand blasting for the irregular minute prominent surface S to have an arithmetic mean deviation of the profile less than 0.158 μm, and it is hard for the prominence to be minute when the arithmetic mean deviation of the profile is higher than 1.374 μm.

It is provided on the arithmetic mean deviation of the profile in KS B 0161 of the Korean Standards, and it is equivalent to the height of a rectangular form of dimension that is the same to the grand total of the area of all protrusions and depressions of the roughness curve-the sectional curve on the surface.

A boundary t is formed between the highly even contact surface SS and the irregular prominent contact surface s due to their regularity of them, and a predetermined pattern is formed on the contact surface 101 due to the boundary, and it is directly expressed on the injection molded products manufactured by the mold 110.

The height H of the average a of the regular prominent contact surface with the average (it is not indicated, since the actual profit to be indicated separately is little) of the irregular prominent contact surface s is 1 μm the 100 μm, and here, 1 μm is a numerical value which is hard to be lowered more, and 100 μm is corresponding to the maximum height that human can't feel the height difference with their eyesight.

It is because the reflecting property of light is different in accordance with the difference of the surface roughness that the boundary t of the highly even contact surface ss and the irregular minute prominent contact surface s is formed by the difference of the surface roughness even though the average height of the average line of the highly even contact surface with the average line a of the irregular minute contact surface as a standard is remarkably higher than the surface roughness of the highly even contact surface ss and the irregular minute prominent contact surface s.

Reference will now be made in detail as for the manufacturing process of the mold 100 as referring to FIGS. 5 to 6, but the description will be focused on the upper part of the mold 100 illustrated in a of FIG. 5, since it is the part that will be the contact surface 101.

The upper part of the mold 100 is processed upon the whole as a highly even contact surface SS at first. As giving a detail, the machining such as NC, end milling and etc are performed for the first, the surface is ground by an oil stone from bigger particle to smaller particle, and the surface is polished by a smooth absorbent cotton with compound on. The polishing process is performed as using absorbent cottons of bigger particle to smaller particle, and it is proper for experts to polish the surface as directly feeling with their hands at the final step. The upper side of the processed mold has an arithmetic mean deviation of the profile of 0.012 μm to 0.073 μm, and a in FIG. 5 illustrates the cross section of a mold 100 that the process is completed.

Figure 5:
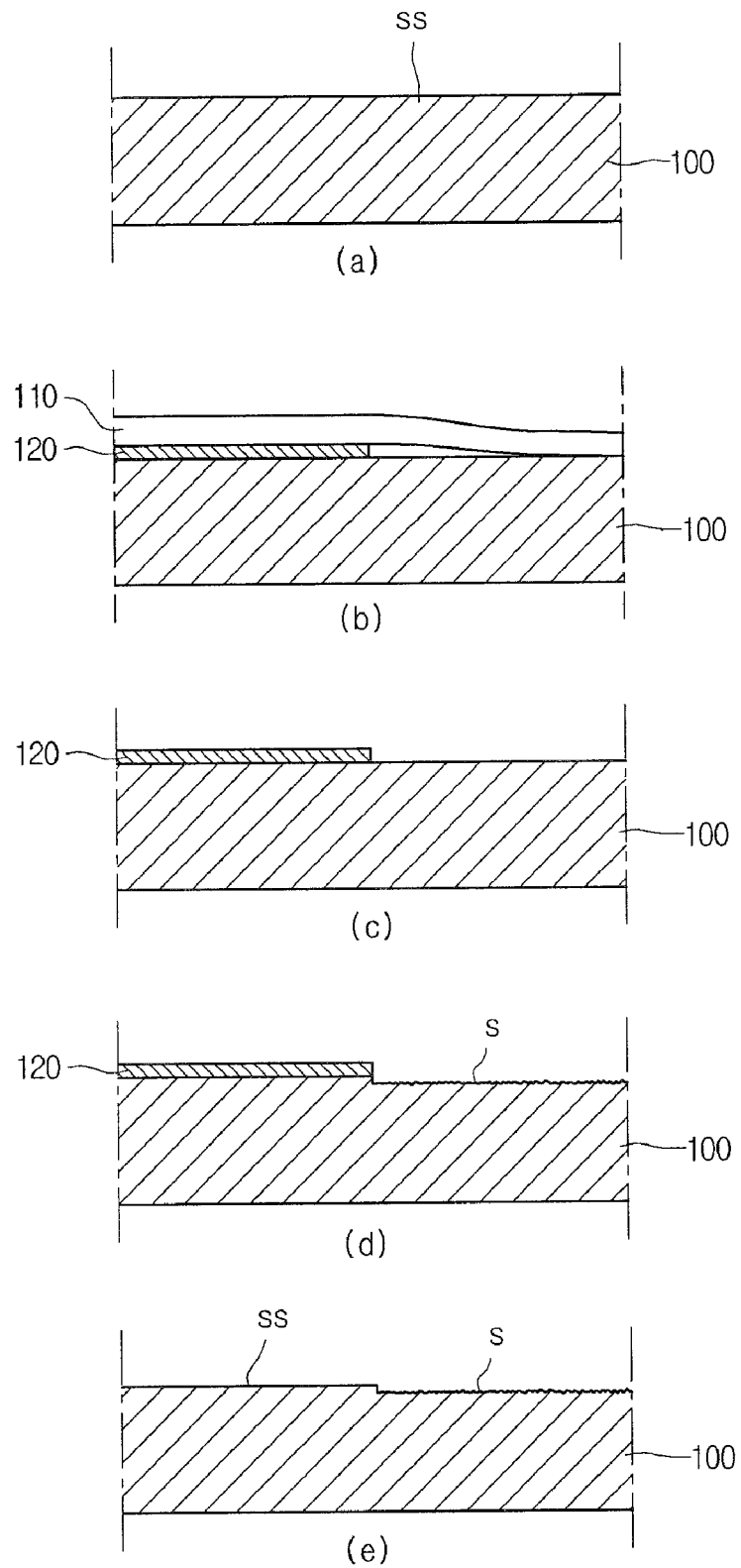
FIG. 5 is a schematic diagram illustrating the process of manufacturing an injection molding mold used for manufacturing the injection molded product according to the present invention.
Figure 6:
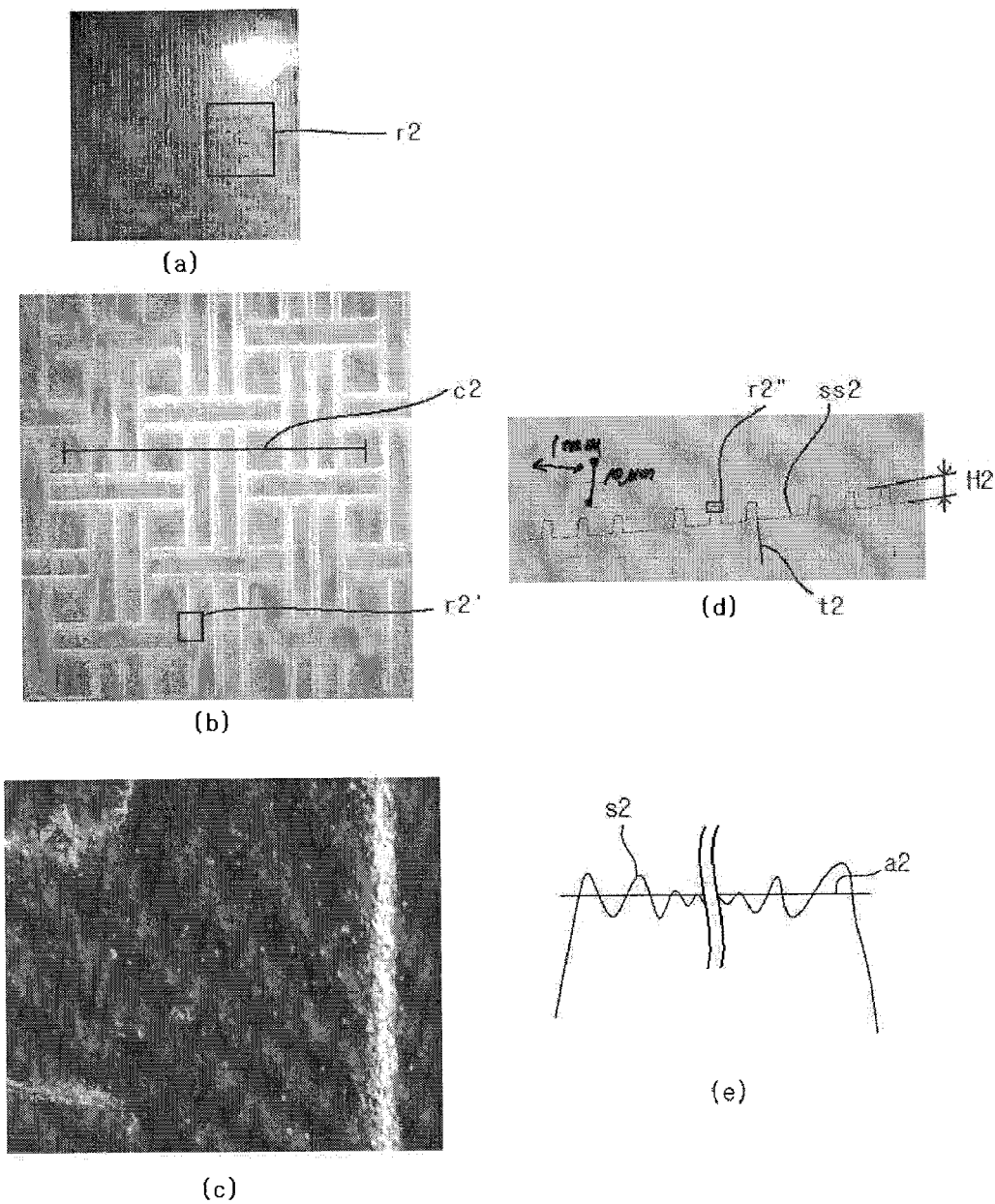
FIG. 6 is a photograph illustrating an example of an injection molded product according to the present invention.

A film 110 on which a transcription material 120 is attached as a predetermined pattern (which will be a highly even contact surface SS) is closely adhered on the highly even contact surface SS which is formed upon the whole (b in FIG. 5). Then, the film is removed after applying and adhering the transcription material 120 on the highly even contact surface SS as throwing light of a predetermined wavelength toward the transcription material or as heating the transcription material with a predetermined temperature (c in FIG. 5). As giving an example, Viasol is applicable for the transcription material, and it is transcribed with ultra violet rays.

After that, the irregular minute prominent contact surface S is formed as the uncovered part is evenly carved by the transcription material 120 performed as a mask when the sand blasting process is performed toward the upper surface of the mold 100 (d in FIG. 5). The height difference H between the average line "a" of the highly even surface s and the average line of the irregular minute prominent contact surface may be controlled with the way of sandblasting.

A mold on which a pattern formed by the boundary of the highly even contact surface and the irregular minute prominent surface s is formed is completed when the transcription material 120 is washed off with a cleaning solution and etc after sand blasting.

Reference will now be made in detail as for an injection molded product manufactured by the mold 100 according to the first preferred embodiment with reference to FIG. 6.

FIG. 6a is a photograph that the surface of a molded material is photographed in the real size, FIG. 6b is a photograph that a part r2 of FIG. 6a as magnified 20 times, FIG. 6c is a photograph that a part r2' of FIG. 6b as magnified 30 times, FIG. 6d is a result of measuring the prominence as cutting along the line c2 in FIG. 6b (the progressing speed of the measuring device is 0.3 mm/s, and the measuring cut off is 0.8 mm), and FIG. 6e is a view illustrating a part r2" of FIG. 6d for the description.r2"

The arithmetic mean deviation of the profile of the highly even surface ss2 of the injection molded product formed by the highly even contact surface ss of the mold is measured as 0.012 μm, and arithmetic mean deviation of the profile of the irregular minute prominent surface s2 formed by the irregular minute prominent surface s of the mold is measured as 0.158 μm. As giving a reference, the line indicated as a2 is the average line of the irregular minute prominent surface s2 of the injection molded product, that is the line corresponding to the average height of the minute prominences, the line indicated as t2 is the boundary of the highly even surface ss2 and the irregular minute prominent surface s2, and the H2 is around 4 μm as a height difference of the highly even surface ss2 and the irregular minute prominent surface s2.

Reference will now be made in detail as for an injection molded material according to a preferred embodiment manufactured by a mold 100 with reference to FIG. 7.

FIG. 7a is a photograph that the surface of a molded material is photographed in the real size, FIG. 7b is a photograph that a part r3 of FIG. 7a as magnified 8 times, FIG. 7c is a photograph that a part r3' of FIG. 7b as magnified 75 times, FIG. 7d is a result of measuring the prominence as cutting along the line c3 in FIG. 7c (the progressing speed of the measuring device is 0.3 mm/s, and the measuring cut off is 0.8 mm), and FIG. 7e is a magnified view of a part r3 of FIG. 7d for the description.

The arithmetic mean deviation of the profile of the highly even surface ss3 of an injection molded product formed by the highly even contact surface ss of the mold is measured as 0.073 μm, and the arithmetic mean deviation of the profile of an injection molded product formed by the irregular minute prominent surface s of the mold is measured as 1.374 μm. As giving a reference, the line indicated as a3 is the average line of the irregular minute prominent surface s3 of the injection molded product, that is the line corresponding to the average height of the minute prominences, the line indicated as t3 is the boundary of the highly even surface ss3 and the irregular minute surface s3, and H3 is around 22 μm as the height difference of the highly even surface ss3 and the irregular minute prominent surface s3.

Figure 7:
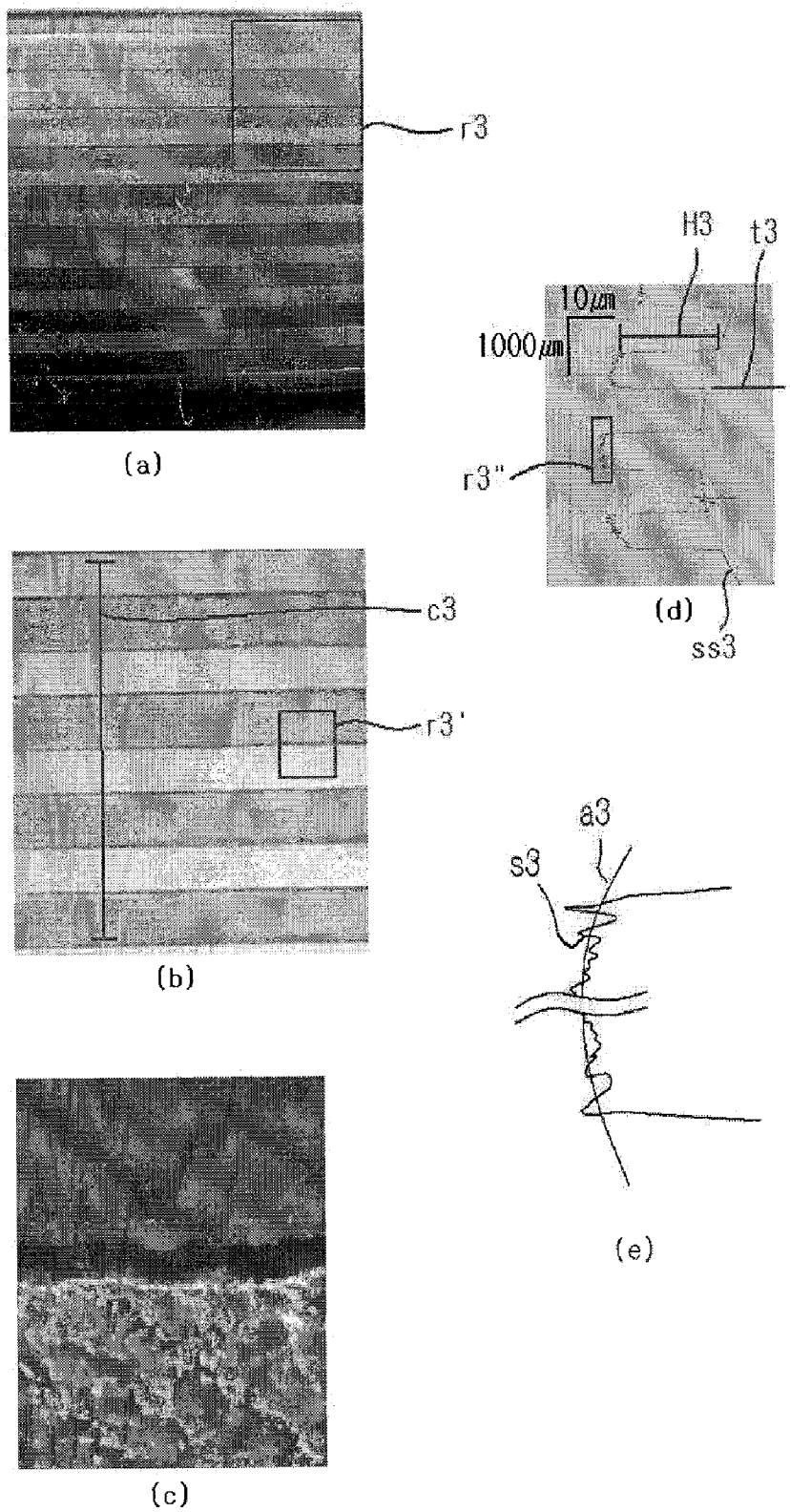
FIG. 7 is a photograph illustrating another example of an injection molded product according to the present invention.

It is shown that the surface of the injection molded product is curved upon the whole in FIG. 7, and it shows that the contact surface s of the highly even surface ss and the irregular minute prominent surface s of the mold may be formed in a curved surface.

The numerical values indicated in the unit of μm are measured with the injection molded product as a standard for the convenience of measurement, therefore, there may be a small difference from the real numerical value such as an error related to an injection molding process, for example, the contraction rate of 0.3% by the refrigerated contraction after the injection molding.

The present invention is described with reference to the preferred embodiment illustrated in views, however, it is only a preferred embodiment, and anyone who has the regular knowledge in the field of the present art can revise the invention and can provide other equal preferred embodiments. Therefore, the real protection boundary of the present invention should be defined by the technical idea of the accompanying claims.

The present invention is applicable for various kinds of injection molded products manufactured with synthetic resins.

What is claimed is:

1. A method of manufacturing an injection molded product, the method comprising:
   providing at least one mold, which comprises a highly even contact surface and an irregular minute prominent contact surface having a profile having an arithmetic mean deviation higher than an arithmetic mean deviation of a profile of the highly even contact surface, wherein a pattern is formed by a difference in the arithmetic mean deviation of the profile of the highly even contact surface and of the irregular minute prominent contact surface, and wherein a visible boundary is formed between the highly even contact surface and the irregular minute prominent contact surface due to a difference in roughness between the highly even contact surface and the irregular minute prominent contact surface; and
   injecting a molding material into the at least one mold to form the product, wherein the providing the at least one mold comprises:
      processing a contact surface of the at least one mold to form the highly even contact surface;
      adhering a film on which a transcription material is attached as a predetermined pattern on a first portion of the highly even contact surface;
      removing the film after adhering the transcription material on the first portion of the highly even contact surface;
      forming the irregular minute prominent contact surface on a second portion of the highly even contact surface; and
      removing the transcription material from the highly even contact surface.

2. The method of manufacturing an injection molded product according to claim 1, wherein the forming the irregular minute prominent contact surface on the second portion of the highly even contact surface is performed by sand blasting.

3. The method of manufacturing an injection molded product according to claim 1, wherein the removing the film after adhering the transcription material on the first portion of the highly even contact surface is performed by directing light of a predetermined wavelength toward the transcription material.

4. The method of manufacturing an injection molded product according to claim 1, wherein removing the transcription material from the highly even contact surface comprising washing off the transcription material with a cleaning solution.

* * * * *